May 30, 1961  A. J. JONES  2,986,457
IRON ORE REDUCTION
Filed Nov. 26, 1957
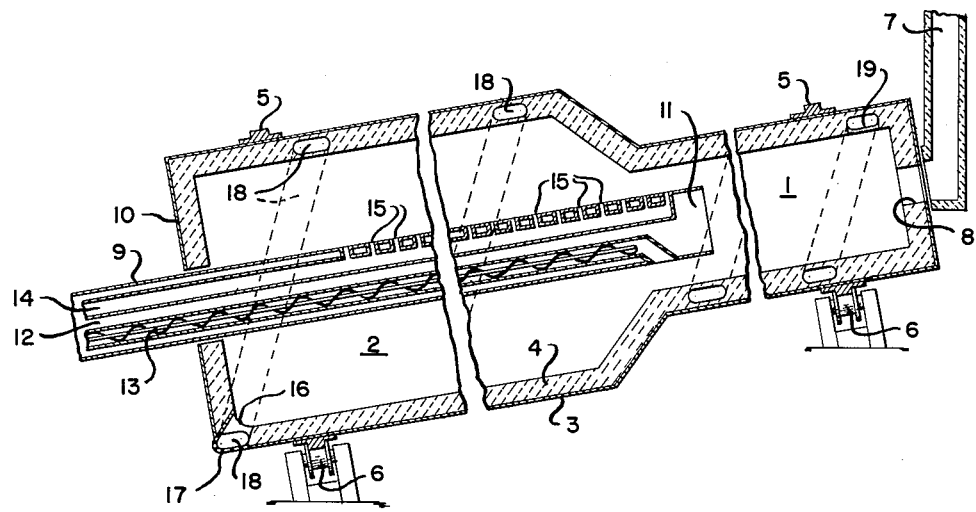
INVENTOR
Arthur J. Jones 2,986,457
Patented May 30, 1961

2,986,457

IRON ORE REDUCTION

Arthur J. Jones, Iron Mountain, Mich.

Filed Nov. 26, 1957, Ser. No. 699,004

7 Claims. (Cl. 75—37)

This invention relates to the reduction of iron ores to metal by subjecting the ores to a heat lower than the fusion temperatures. This invention is particularly suited for the reduction of iron ores to semi-reduced or fully reduced metal.

The reduction of iron ore to metal is a highly endothermic process which requires the addition of much heat. The problem is further complicated by the fact that the ore and reducing agent forms a mass of poor heat conductivity through which heat can be driven only slowly from an external source.

I provide a pellet heating chamber, means to supply a plurality of heat absorbent pellets to said chamber, means to supply heat to said chamber, a reduction chamber arranged to receive pellets from said heating chamber, and means to deliver ore and a corbonaceous reducing agent to the reduction chamber. I provide an outlet from the reduction chamber and preferably provide in conjunction therewith means for separating the heat absorbent pellets from the semi or fully reduced iron ore and carbonaceous material. I further preferably provide means to recirculate said heat conducting pellets to the heating chamber for reheating.

I prefer to provide a cylindrical heating chamber having its axis at an angle to the horizontal and arranged for rotation, whereby the heat absorbent pellets may be caused to advance along the length of the heating chamber. I further preferably provide a cylindrical reduction chamber arranged at an angle to the horizontal and arranged for rotation, whereby the heat conducting pellets, ore, and reducing agent may be maintained in intimate admixture.

Other details, objects and advantages of my invention will become apparent as the following description of certain present preferred embodiments of my invention proceed.

In the accompanying drawing, I have illustrated a present preferred embodiment of my invention in which the figure is a side elevation, taken in section, of a furnace for the reduction of iron ore to metal.

Referring now to the drawing, a cylindrical heating chamber 1 is provided, and a reduction chamber 2 of larger diameter than the heating chamber is arranged axially with heating chamber 1. The axis of the chambers slopes downwardly from the heating chamber to the reduction chamber. A steel shell 3 and refractory lining 4 are provided surrounding and defining both chambers. The entire assembly is rotatably mounted on tracks 5 resting on flanged rollers 6 and may be rotatably driven in any convenient fashion. A flue 7 is provided leading from an opening 8 at the upper end of heating chamber 1. A member 9 projects within the assembly through end wall 10 of reduction chamber 2. The member terminates in a burner indicated at 11 which is supplied with a combustible mixture through tube 12, thereby supplying heat to heating chamber 1. Ore and a carbonaceous reducing agent are charged through a screw conveyor 13 to the upper end of reduction chamber 2. Air is supplied through a tube 14 to a series of tuyeres 15 on the upper surface of member 9. An outlet 16 from reduction chamber 2 is covered by a screen 17 through which semi or fully reduced iron may pass to a hopper or other convenient collecting means. A convolute passageway 18 is formed in the refractory lining 4 and extends from a point adjacent outlet 16 to heating chamber 1 terminating at 19 for return of pellets to heating chamber 1.

A plurality of heat absorbent pellets are provided in circulation within the apparatus. The pellets are formed of a chemical inert substance having good heat absorption characteristics. Pieces of refractory are entirely satisfactory for these purposes. As the pellets are deposited in heating chamber 1, they will gradually advance along the length of the heating chamber and will be turned over and intermixed by the rotary action of the heating chamber, having their various faces exposed. The heat supplied from burner 11 will pass in the opposite direction along a length of the chamber and will supply heat to all of the pellets. As the pellets reach the end of heating chamber 1, they cascade downwardly along the sloping wall from heating chamber 1 into reduction chamber 2, becoming intermixed with iron ore and carbonaceous reducing agent supplied by conveyor 13. Rotation of reduction chamber 2 will continuously intermingle the iron ore, carbonaceous material, and pellets. The ore and reducing agent are initially mixed with the pellets by being deposited on the sloping wall extending between the main portion of the heating and reduction chambers. After intermixing, the pellets give their heat up to the cooler ore and reducing agent, raising them to a sufficiently high temperature to reduce the iron ore. The temperature need not exceed 1800° F. for suitable reduction. The continuing rotation of reduction chamber 2 will continue to intermix the ore, carbonaceous material, and pellets as well as advancing them along the length of the reduction chamber.

When the mass reaches the lower or outlet end of chamber 2, the products remaining will ordinarily be semi or fully reduced iron and the refractory pellets, although some carbonaceous material may remain. They are separated by passing over screen 17, the reduced iron and any residual carbonaceous material going through the screen. The refractory pellets are gathered in the mouth of passageway 18 and are carried by rotation up the passageway to the head of heating chamber 1. As the pellets pass through passageway 18, they give up their heat to the refractory lining surrounding reduction chamber 2, thereby adding heat for the carrying out of the endothermic reduction reaction.

Air tuyeres 15 are directed upwardly above member 9. The tuyeres supply combustion air for combustion of gases driven off during the reduction process in the lower portion of reduction chamber 2. The combustion is adjacent the refractory wall 4 in the upper part of reduction chamber 2, and the heat of combustion is absorbed by the wall to be carried around to the bottom of the chamber and there be given up to the ore mass to further aid in carrying out the endothermic reaction. The combustion, although taking place in the reduction chamber is in a remote part from the reduction zone, and the combustion products move toward the heating chamber and flue 7 without coming into contact with the mass in the lower part of the reduction chamber.

From the foregoing, it will be seen that I have invented novel and useful means for the reduction of ore. The separate and distinct heating and reduction zones separate the process of combustion from the process of reduction.

The provision of a separate heating zone and the carrying of heat into a reduction zone results in a purely reduction process unaffected by fuel combustion. The use of refractory pellets and the continuous intermixing of ore, pellets, and carbonaceous material brings the heat and reducing agent into intimate contact with all parts of the ore body. The process is, therefore, one which is generally free of size limitations and which may be used in any convenient size chamber. A bed of any convenient depth may be maintained in reduction chamber 2 without disturbing or changing the reducing process taking place therein by a change of proportion or the like. The process may be used, therefore, at any rate within the capacity of the apparatus to handle the feed, and the size of the apparatus is free from any limitations imposed by the process.

While I have illustrated and described a present preferred embodiment of my invention, it is to be understood that it is not limited thereto and may be otherwise variously practiced within the scope of the following claims.

I claim:

1. Means for reducing iron ore comprising a cylindrical particle heating chamber arranged at an angle to the horizontal plane, means to supply a plurality of heat absorbing particles to the elevated end of said heating chamber, said chamber being rotatably mounted for gradual advance of said particles toward the lower end, means to supply heat to said heating chamber, a cylindrical reduction chamber at least in part at a lower elevation than the heating chamber and arranged for discharge of particles from said heating chamber into said reduction chamber, said reduction chamber being arranged at an angle to the horizontal plane and rotatably mounted for gradual advance of the contents toward an outlet, means to supply iron ore and carbonaceous material to said reduction chamber, means to separate reduced iron and said heat absorbing particles adjacent said outlet, and means to return said heat absorbing particles to the heating chamber for reheating.

2. Means for deucing iron ore comprising a cylindrical particle heating chamber arranged at an angle to the horizontal plane, means to supply a plurality of heat absorbing particles to the elevated end of said heating chamber, said chamber being rotatably mounted for gradual advance of said particles to the lower end thereof, means to supply heat to said heating chamber, a reduction chamber axially aligned with said heating chamber adjacent the lower end thereof, said reduction chamber receiving particles discharged from the lower end of said heating chamber, means to deliver iron ore and carbonaceous material to said reduction chamber where the ore and carbonaceous material are maintained in admixture with said particles for reduction of the ore, means to separate said particles from the reduced iron and to discharge said iron from the reduction chamber, and means to return said particles to the heating chamber.

3. Means for reducing iron ore comprising a cylindrical particle heating chamber arranged at an angle to the horizontal plane, means to supply a plurality of heat absorbing particles to the elevated end of said heating chamber, said chamber being rotatably mounted for gradual advance of said particles to the lower end thereof, means to supply heat to said heating chamber, a reduction chamber axially aligned with said heating chamber adjacent the lower end thereof, said reduction chamber receiving particles discharged from the lower end of said heating chamber, means to deliver iron ore and carbonaceous material to said reduction chamber where the ore and carbonaceous material are maintained in admixture with said particles for reduction of the ore, means to separate said particles from the reduced iron and to discharge said iron from the reduction chamber, and a convolute passage leading from the separating means to the heating chamber in close proximity to the walls of the reduction chamber, whereby additional heat is given up from said particles to the reduction chamber.

4. The method of reducing metallic ore which comprises supplying a plurality of heat conveying particles to a heating zone, heating the particles therein, transferring the particles to a reducing zone and intimately mixing them with the ore and a reducing agent for the reduction of the ore, burning gases resulting from the reduction process and delivering the heat therefrom to the reduction zone and segregating the particles from the remaining products and returning them to the heating zone.

5. The method of reducing metallic ore which comprises supplying a plurality of heat conveying particles to a heating zone, heating the particles therein, transferring the particles to a reducing zone and intimately mixing them with the ore and a reducing agent for the reduction of the ore, burning gases resulting from the reduction process and delivering the heat therefrom to the reduction zone and segregating the particles from the remaining products and recirculating them to the heating zone in close proximity to the reduction zone whereby additional heat is given up from the particles to the reduction zone.

6. Means to reduce iron ore comprising a cylindrical pellet heating chamber arranged at an angle to the horizontal plane, means to supply heat conveying pellets to said heating chamber, said chamber being rotatably mounted for gradual advance of pellets toward one end of the chamber, means to supply heat to said chamber, a cylindrical reduction chamber in pellet receiving relationship to the heating chamber, means to supply iron ore and a carbonaceous reducing agent to said reduction chamber, said chamber being rotatably mounted for intimate admixing of the heated pellets, iron ore, and reducing agent and for advance of said admixture toward one end of said reduction chamber, means to supply combustion air in the upper portion of the reduction chamber remote from the iron ore charge for heating of the walls of the reduction chamber, means to separate said pellets from reduced iron at said one end of the reduction chamber, and means to return said pellets to the heating chamber for reheating.

7. Means for reducing ore comprising a unitary shell having a pellet heating zone, means to deliver inert, heat absorbing pellets to said heating zone, means to supply heat to said pellets in said heating zone, an ore reduction zone in pellet receiving relationship to the heating zone, means to deliver ore and a reducing agent to the reduction zone, means to discharge reduced metal from said reduction zone, and means to return pellets from the reduction zone to the heating zone in close proximity to the walls of said unitary shell whereby heat is delivered from said pellets to said walls.

References Cited in the file of this patent

UNITED STATES PATENTS

| | | |
|---|---|---|
| 2,399,450 | Ramseyer | Apr. 30, 1946 |
| 2,592,783 | Aspegren | Apr. 15, 1952 |
| 2,788,313 | Aspegren | Apr. 9, 1957 |
| 2,877,106 | Aspegren | Mar. 10, 1959 |

UNITED STATES PATENT OFFICE
CERTIFICATE OF CORRECTION

Patent No. 2,986,457                        May 30, 1961

Arthur J. Jones

It is hereby certified that error appears in the above numbered patent requiring correction and that the said Letters Patent should read as corrected below.

Column 1, line 30, for "corbonaceous" read -- carbonaceous --; column 2, line 11, for "chemical" read -- chemically --; column 3, line 37, for "deucing" read -- reducing --; column 4, line 45, strike out "one".

Signed and sealed this 17th day of October 1961.

(SEAL)
Attest:

ERNEST W. SWIDER
Attesting Officer

DAVID L. LADD
Commissioner of Patents

USCOMM-DC